UNITED STATES PATENT OFFICE.

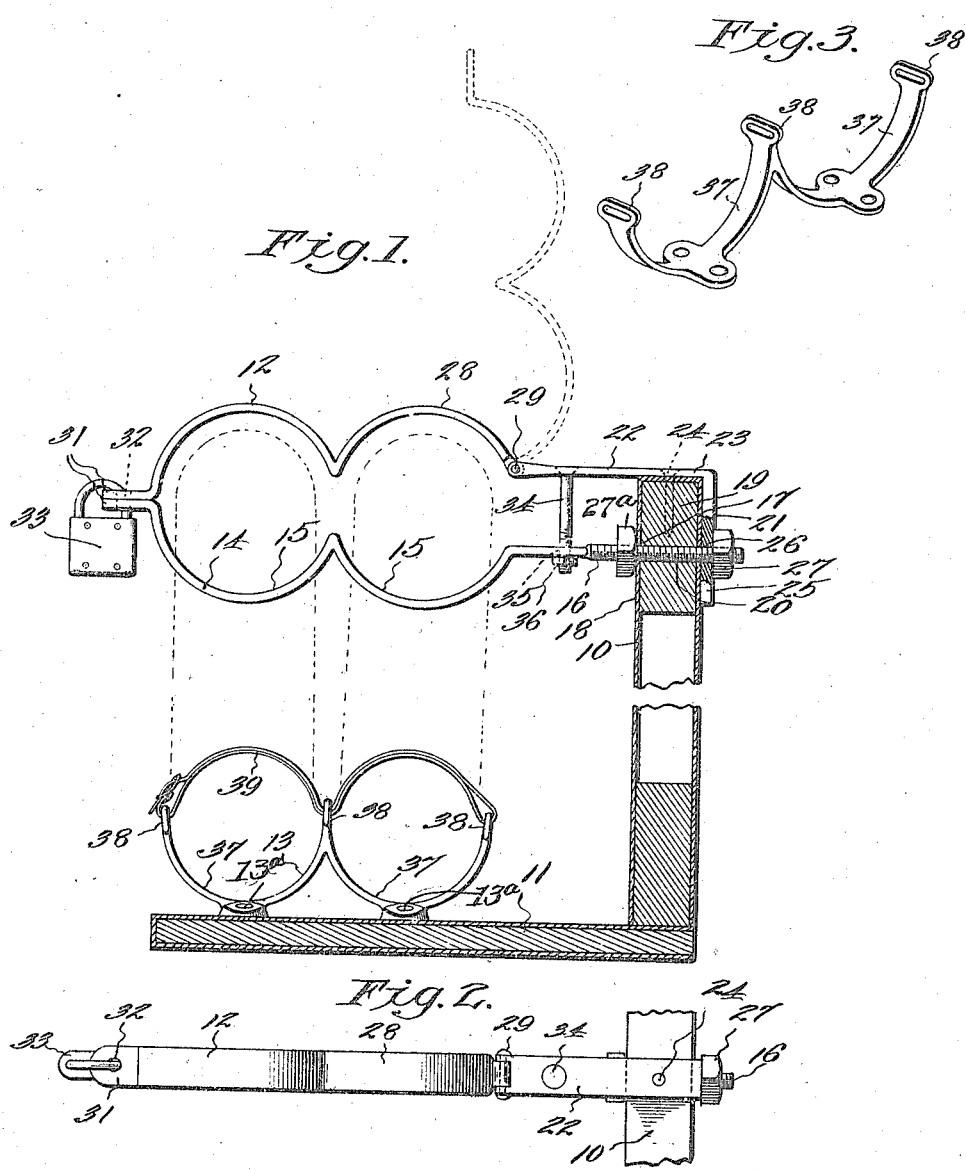

EUGENE H. ELLEBY, OF ATLANTA, GEORGIA.

AUTOMOBILE-TIRE HOLDER.

1,264,034.  Specification of Letters Patent.  Patented Apr. 23, 1918.

Application filed June 1, 1917. Serial No. 172,230.

*To all whom it may concern:*

Be it known that I, EUGENE H. ELLEBY, a citizen of the United States, residing at Atlanta, in the county of Fulton and State of Georgia, have invented new and useful Improvements in Automobile-Tire Holders, of which the following is a specification.

This invention relates to tire holders, especially adapted for use in holding spare tires on motor vehicles.

The primary object of the invention is the provision of a tire holder which may be quickly secured to the body of a vehicle in an out-of-the-way position, for the purpose of holding spare tires in a manner to prevent their unauthorized removal, the device being adapted to be secured to the body of the car upon the side of and adjacent the driver, the method of securing the same being such as to prevent its removal when the tires are locked in position therein.

The invention contemplates the provision of a holder consisting of an upper and a lower section, the upper section being designed to be secured to the upper edge of the vehicle body and the lower section secured to the running board of the vehicle below the said upper section. The upper section includes upper and lower members, the upper member being provided with an angular portion for engagement over the top edge and upon the inside of the vehicle body, this member terminating short of the end of the lower member to provide a tire receiving opening, which is adapted to be closed by a hinged portion, the said hinged portion being provided with means whereby it may be locked to the lower member for securely holding the tires in position therein. The lower member of the upper section is formed with a threaded shank which extends through an opening in the vehicle body and through an aperture in the angular portion of the upper section and is secured therein by means of a suitable fastening device, the two sections being held in vertical alinement and when locked together cannot be removed from the body of the vehicle. The lower section is secured to the vehicle running board directly beneath the upper section and is provided with means for receiving a flexible element by means of which the tires may be secured in position in a manner to prevent their contact, thereby eliminating wear due to the tires rubbing together.

With the above and other objects in view, the invention consists of the following novel combination and arrangement of parts, hereinafter more fully described and illustrated in the accompanying drawings, in which—

Figure 1 is an elevation of the tire holding means secured to the body of a motor vehicle, only a sufficient portion of the vehicle being shown to illustrate the application of the invention, the tires being shown in position therein by dotted lines;

Fig. 2 is a plan view of the upper member;

Fig. 3 is a detailed perspective view of the lower member.

Referring to the drawings in detail, there is illustrated a portion of the body of a motor vehicle, which is designated by the reference character 10. The portion shown may consist of that side of the vehicle body immediately adjacent the driver, which in some makes of vehicles is the door, while in other makes it is rigid with the body, the invention being primarily intended for use in connection with those of the latter construction. In addition to the body portion 10, there is provided a running board 11, as the invention includes an upper tire engaging member and a lower tire engaging member, which are designated by the reference characters 12 and 13 respectively, and which are respectively secured to the portions 10 and 11 before mentioned.

The upper tire engaging member comprises a lower section 14, which is preferably formed with tire engaging seats 15, there being two of such seats shown, although it is of course obvious that the invention is not restricted to this number. This lower section is provided with a shank 16, which is adapted to be passed through openings 17 formed in the body portion 10. This body portion is hollow as shown and in order to provide a more secure support for the holder, there is provided between the side walls 18 of this body portion a filler block 19, which is formed with an opening 20 therethrough, which is adapted to register with the openings 17 to receive the shank 16.

The upper section of the member 12 is provided with an angular portion 21, which includes a horizontally disposed portion 22, which is adapted to engage the upper edge 23 of the portion 10 and to be secured thereto through the medium of a screw 24 or other suitable fastening device. The angular portion 21 also includes a depending leg 25, which is provided with an opening 26, which is brought into alinement with the openings 17 and 20 for the purpose of receiving the shank 16, which is threaded to receive the nuts 27 and 27$^a$, by means of which the upper and lower sections are fastened together and secured to the vehicle, the nut 27$^a$ also serving to cover the opening 17.

The upper section or portion 22 terminates short of the end of the lower section, in order to provide an opening for the reception of the tires. This opening is adapted to be closed by means of a hinged section 28, which is secured to the portion 22 by means of the hinged end 29. Each of the sections of the member 12 are provided with an extending flange 31, said flanges being formed with apertures 32, for the reception of a suitable lock 33, by means of which said sections are locked together.

In order to further secure the two sections in their alined position, there is provided a connecting bolt 34, which engages portion 22 of the upper section and passes through an opening 35 in the lower section, and has positioned upon its threaded end a nut 36.

The lower member is secured to the running board by means of the bolts 13$^a$ and is formed with the tire receiving seats 37, which are adapted to be positioned and alined beneath the seats 15 of the upper member, for the purpose of receiving the tires therein. The lower member is provided with loops 38, one of which is adapted to have secured thereto one end of a flexible element preferably in the form of a strap 39. This strap is then passed through the center loop and has its opposite end secured to the opposite end loop 38 by means of a buckle or other device. When the tire is secured within the holder the portion of the strap passing through the center loop 38 will separate the tires and prevent them from rubbing together and becoming worn or damaged.

It is believed that the above description when taken in connection with the accompanying drawings will enable persons skilled in the art to understand the construction and advantages of the invention and that further description is unnecessary.

Having described the invention, what is claimed is:

1. The combination with a vehicle, of a tire holder including an upper tire engaging member, said member comprising upper and lower tire engaging sections, the lower section being provided with a threaded shank adapted to pass through an opening provided in the side of the vehicle body, an angular portion provided upon the upper section and adapted to engage the edge of the vehicle body and to extend within the same, said extending portion being formed with an opening to receive the shank of the lower section, means for securing said shank within said opening, means provided upon the outside of the body of the vehicle to hold the upper and lower sections in alined position, a hinged portion provided in one of said sections, means for locking said hinged portion in a closed position and a lower tire engaging member secured to said vehicle.

2. The combination with a vehicle, of a tire holder comprising an upper tire engaging member, said member comprising spaced parallel upper and lower arms, a right angularly extending terminal portion carried by the upper arm for contact with the inner wall of the vehicle body, a shank carried by the lower arm and extending through the side wall of the vehicle and through an opening provided in the terminal portion of the upper arm and coöperating means carried by the opposite ends of each of said arms for engagement with the tire.

In testimony whereof I affix my signature.

EUGENE H. ELLEBY.

Copies of this patent may be obtained for five cents each, by addressing the "Commissioner of Patents, Washington, D. C."